Sept. 20, 1955 L. J. SCHMUCKER ET AL 2,718,318
MANURE LOADER
Filed Aug. 27, 1952 2 Sheets-Sheet 1
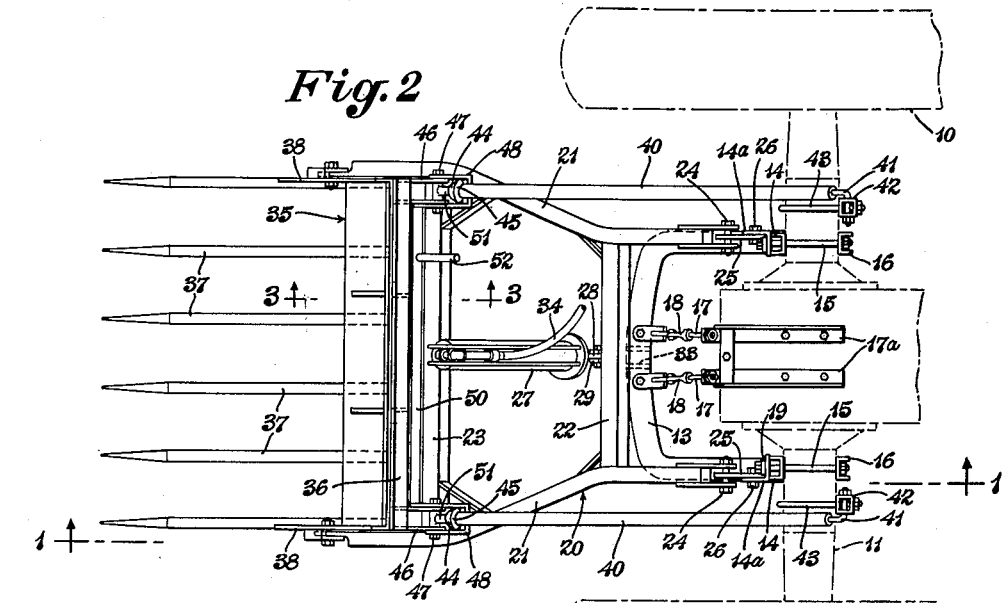
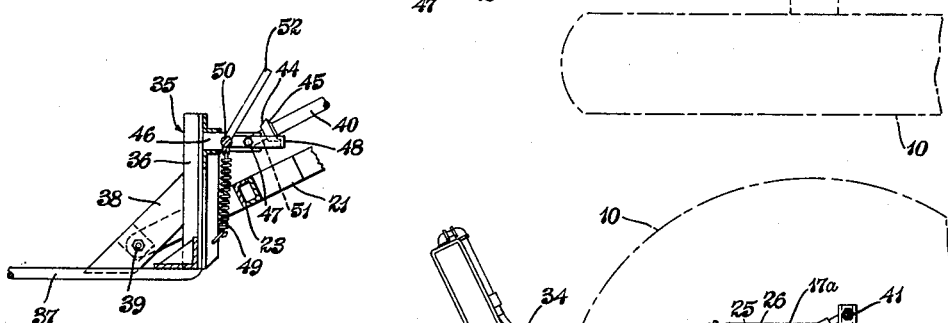
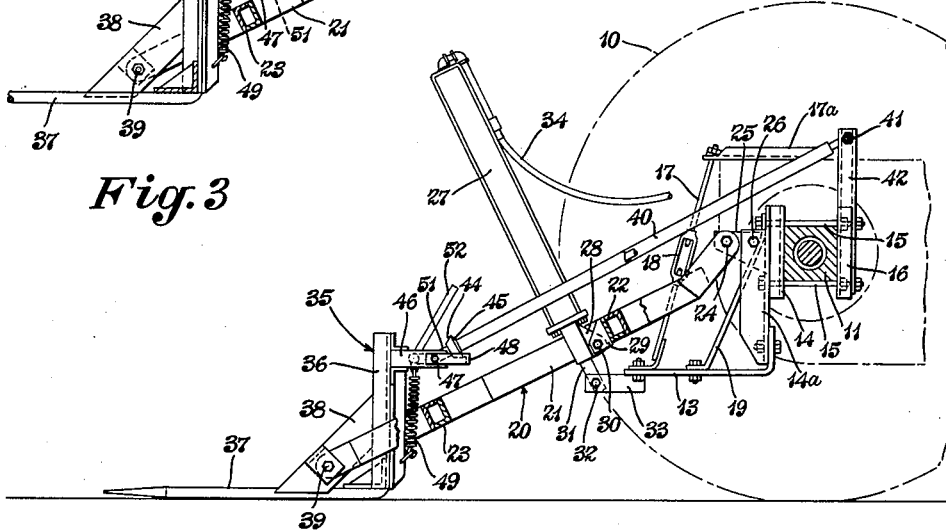
INVENTORS
Lester J. Schmucker and
James J. Schumacher
Frease & Bishop
ATTORNEYS Sept. 20, 1955 L. J. SCHMUCKER ET AL 2,718,318
MANURE LOADER
Filed Aug. 27, 1952 2 Sheets-Sheet 2
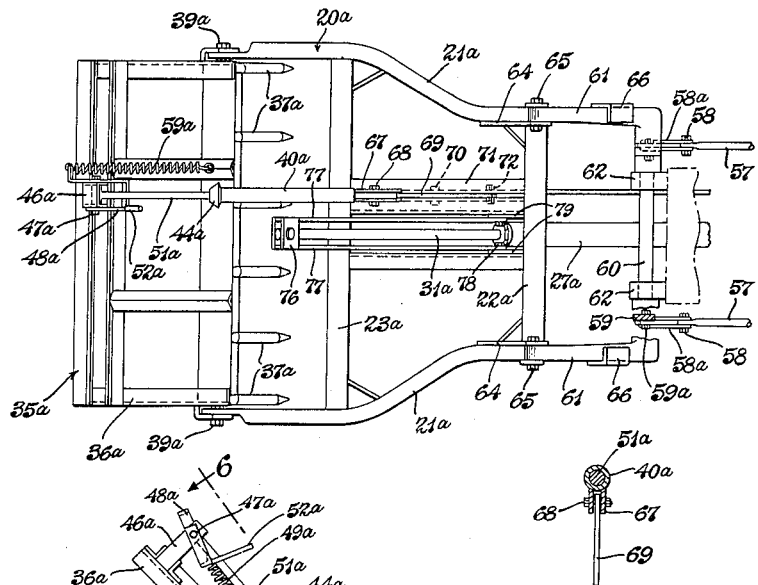
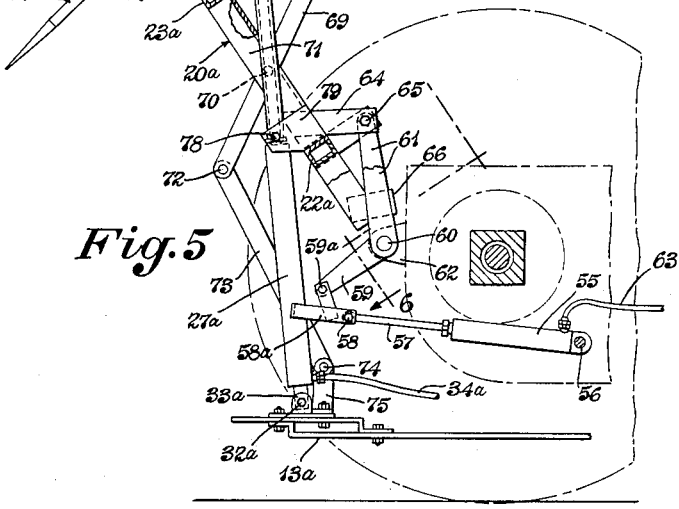
INVENTORS
Lester J. Schmucker
James J. Schumacher
Frease & Bishop
ATTORNEYS Patented Sept. 20, 1955

2,718,318

2,718,318
MANURE LOADER

Lester J. Schmucker and James J. Schumacher, near Louisville, Ohio

Application August 27, 1952, Serial No. 306,632

3 Claims. (Cl. 214—140)

The invention relates to apparatus for lifting and transferring materials and more particularly to a manure loader.

An object of the invention is to provide a manure loader mounted upon the rear end of a tractor, and including a bucket or fork arranged to be maintained in horizontal position while being elevated from a lower filling position to an upper discharging position.

Another object is to provide such an apparatus which can be quickly and easily mounted as an attachment upon tractors of conventional design.

A further object is to provide a novel latching mechanism for holding the loaded bucket or fork while it is being elevated and releasing it for discharging the contents.

A still further object is to provide such a latching mechanism including a tube pivotally mounted relative to the tractor and having a collar at its free end, and a rod pivotally connected to the bucket or fork and telescoped within the tube, a pivoted clevis upon the bucket normally engaging the collar to hold the bucket in horizontal position.

It is also an object of the invention to provide fluid cylinder operated means for raising and lowering the pivoted frame which carries the bucket or fork.

The above objects together with others which will be apparent from the drawings and description, or which may be later pointed out, may be attained by constructing the improved manure loader in the manner hereinafter described in detail and illustrated in the accompanying drawings, in which;

Fig. 1 is a longitudinal sectional view of a preferred embodiment of the invention, showing in broken lines the rear portion of a conventional type of tractor to which it is attached, showing the manure loader in the lowered or loading position, taken as on the line 1—1, Fig. 2;

Fig. 2 a top plan view of the improved manure loader in lowered position;

Fig. 3 a fragmentary sectional view of the latching mechanism, taken on the line 3—3, Fig. 2;

Fig. 4 a perspective view of the apparatus shown in Figs. 1 and 2, showing the manure loader in raised position with the bucket or fork latched in horizontal position;

Fig. 5 a longitudinal sectional view of a modified form of the invention attached to another type of tractor, showing the pivoted frame in elevated position and the bucket or fork in the discharging position;

Fig. 6 an elevation of the manure loader viewed as on the line 6—6, Fig. 5; and, Fig. 7 a detached, fragmentary section, taken as on the line 7—7, Fig. 5.

Referring first more particularly to the embodiment of the invention illustrated in Figs. 1 to 4, in which similar numerals refer to similar parts throughout, the rear wheels of a conventional tractor are indicated at 10 and the rear axle housing thereof at 11. The draw bar of the tractor is shown at 13 connected to the rear side of the axle housing 11 as by the channel members 16 and tie bolts 15 which also connect the channel members 14 to the front side of the axle housing.

The above described parts, as well as the struts 19, connected to the channel members 14 and the draw bar 13, are standard parts upon conventional types of tractors and in themselves form no part of the present invention. Tie rods 17, with turn buckles 18, are connected to the angle members 17a and to the draw bar 13 for additionally supporting the same.

The apparatus to which the invention relates comprises a frame, indicated generally at 20, formed of the two bent side members 21 connected by the spaced transverse members 22 and 23. The forward ends of the side members 21 are pivotally connected, as at 24, to the gusset plates 25 which are bolted or otherwise rigidly attached to the angle members 14a as indicated at 26.

For the purpose of raising and lowering the frame 20, a fluid cylinder 27 is provided, being pivotally connected at its lower end to the frame as by means of the ear 28 upon the lower end of the cylinder which is pivotally mounted between the ears 29 fixed upon the cross member 22 of the frame as by the pivot bolt 30.

The lower end of the piston rod 31 is pivotally connected, as at 32, to the ears 33 fixed to the underside of the draw bar 13 of the tractor. Fluid may be admitted to and discharged from the upper end of the cylinder through a hose 34 connected to a conventional fluid pump (not shown) upon the tractor.

The bucket or fork is indicated generally at 35 and comprises a transversely extending bolster 36 to the lower end of which is attached a plurality of parallel tines 37. Side plates 38, at opposite ends of the fork, are pivoted as at 39 to the outer ends of the side members 21 of the pivoted frame.

For the purpose of normally holding the bucket or fork in substantially horizontal position, a novel latching mechanism is provided which forms an important part of the invention. This latching mechanism includes a pair of tubular members 40, pivotally connected at their forward ends, as at 41, upon the upright bars 42 which are connected to the axle housing 11 of the tractor as by U-bolts 43.

An annular collar 44 is fixed to the outer end of each tubular member 40 and is slightly bevelled on its forward side as indicated at 45. Arms 46 are connected to the bolster member 36 of the bucket or fork, at opposite sides and near the top thereof, and pivoted to each of said arms at 47 is a clevis member 48 which normally engages over the bevel face 45 of the adjacent collar 44 to hold the bucket or fork against tilting movement upon its pivots 39.

A spring 49 is connected to the rod 50, which connects the clevis members 48 together, and normally holds them in the raised position as shown in Figs. 1, 2 and 3. A rod 51 is slidably mounted within each tube 40 and its outer end is connected to the adjacent pivot 47.

For the purpose of releasing the clevises 48 from engagement with the collars 44, a handle 52 is connected to the rod 50. By swinging this handle clockwise, as viewed in Figs. 1 to 3, the clevis latching members 48 will be swung upon their pivots 47 out of engagement with the collars 44, permitting the weight of the load upon the elevated fork to tilt the fork rearwardly sufficiently upon its pivots 39 to discharge the load therefrom.

In Figs. 5, 6 and 7 is shown a modified form of the invention, adapted for connection to a different type of tractor. In this tractor the draw bar is indicated at 13a and connected to the frame of the tractor in a manner usual in such tractors.

The tractor is also provided with a pair of fluid cylinthe lever to said bracket, a rod slidable within the other end of the tube, means pivotally connecting the other end of the rod to the bucket near the top thereof, means normally holding the rod from sliding within the tube, means for operating said second named fluid cylinder and piston rod to raise the frame and tube to upright position while maintaining the bottom of the bucket in substantially horizontal position, and means for releasing said holding means to cause the rod to slide on the tube and the bucket to tilt upon its pivot on the frame.

3. A manure loader for a tractor having a transversely disposed horizontal rocker shaft journalled thereon, a pair of rocker arms upon said shaft disposed angularly to each other and a substantially horizontal fluid cylinder pivotally mounted upon the tractor and having a piston rod for operating said rocker shaft, said manure loader comprising a frame, means mounting one end of the frame upon the uppermost of said rocker arms for vertical swinging movement, an angular link pivotally connected to said piston rod and to the lowermost of said rocker arms, means pivotally connecting the uppermost rocker arm to an intermediate portion of the frame, a rearwardly extending rigid bracket upon the rear portion of the tractor below said pivotal mounting, an upright fluid cylinder and piston rod assembly, means pivotally connecting the lower end of the cylinder to said bracket, links pivotally connected at opposite ends to the upper end of said second named piston rod and to an intermediate portion of the frame, a bucket comprising a normally vertical back portion and a normally horizontal bottom portion, means pivotally connecting the other end of the frame to the bucket near the bottom thereof, a tube located parallel to and above the frame, means pivotally connecting one end of the tube to the tractor, said last-named means comprising a lever fulcrumed intermediate its ends upon an intermediate portion of the frame, means pivotally connecting one end of the lever to said one end of the tube, and a link pivotally connecting the other end of the lever to said bracket, a rod slidable within the other end of the tube, means pivotally connecting the other end of the rod to the bucket near the top thereof, means normally holding the rod from sliding within the tube, means for operating both of said fluid cylinders and piston rods to raise the frame and tube to upright position while maintaining the bottom of the bucket in substantially horizontal position, and means for releasing said holding means to cause the rod to slide on the tube and the bucket to tilt upon its pivot on the frame.

References Cited in the file of this patent

UNITED STATES PATENTS

| | | |
|---|---|---|
| 2,383,686 | Ryan | Aug. 28, 1945 |
| 2,385,512 | Heath | Sept. 25, 1945 |
| 2,398,585 | Hayward | Apr. 16, 1946 |
| 2,449,212 | Fraga | Sept. 14, 1948 |
| 2,481,251 | Severin et al. | Sept. 6, 1949 |
| 2,518,105 | Werth | Aug. 8, 1950 |
| 2,543,496 | Holopainen | Feb. 27, 1951 |
| 2,597,692 | Wills et al. | May 20, 1952 |
| 2,622,749 | Stuhr | Dec. 23, 1952 |